United States Patent Office 2,833,688
Patented May 6, 1958

2,833,688
ADDITION PRODUCTS

Van R. Gaertner, Dayton, Ohio, assignor to Monsanto Chemical Company, St. Louis, Mo., a corporation of Delaware No Drawing. Application December 12, 1955
Serial No. 552,255

11 Claims. (Cl. 167—33)

The present invention relates to new and valuable addition products of certain hydrocarbon hydrazines and dienic sultones, methods of producing the same and biological toxicants comprising the new addition products.

According to the invention there are obtained valuable adducts in which two moles of a hydrocarbon substituted hydrazine which is free of non-benzenoid unsaturation and has from 1 to 12 carbon atoms are combined with one mole of a dienic sultone of the formula

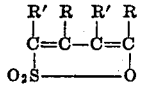

in which R is an alkyl radical of from 1 to 4 carbon atoms and R' is selected from the class consisting of R and hydrogen. Sultones having the above formula are readily obtained by the reaction of certain olefinic ketones with sulfuric acid in the presence of acetic anhydride, substantially as described by Morel (Rec. trav. chim. 67: 539–44 (1948) C. A. 43: 1391). Sultones which are presently useful for the preparation of the present adducts are those obtained from $\alpha,\beta$ or $\beta,\gamma$-unsaturated ketones in which there is present a mono-olefinic chain of at least 3 carbon atoms having branching at the $\beta$-position with respect to the carbonyl and two hydrogen atoms either in the $\gamma$-position or one hydrogen each in the $\alpha$ and $\gamma$-positions. Examples of sultones having the above formula and obtained according to said Morel reaction are those obtained from the following ketones:

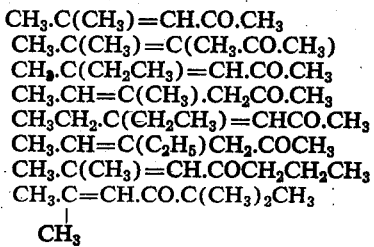

The presently useful sultones may thus be described as delta-sultones of 4-hydroxy-1,3-butadiene-1-sulfonic acids in which each carbon atom of the butadiene chain may have an alkyl substituent of from 1 to 4 carbon atoms.

Hydrocarbon hydrazines useful in preparing the present adducts have the formula

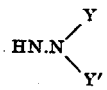

in which Y is a hydrocarbon radical free of non-benzenoid unsaturation and containing from 1 to 12 carbon atoms and Y' is selected from the class consisting of Y and hydrogen.

One group of hydrocarbon hydrazines having the above formula includes the alkyl- or 1,1-dialkylhydrazines having from 1 to 12 carbon atoms in the alkyl radical, e. g., ethyl-, amyl-, or n-octylhydrazine or 1,1-di-n-propyl-1,1-diisohexyl- or 1-amyl-1-butylhydrazine. Another group includes the cycloalkyl- or 1,1-dicycloalkylhydrazines, e. g., cyclopentyl-1,1-dicyclohexyl- or 1-cyclohexyl-1-(3-methylcyclopentyl)hydrazine. Still another group includes the aralkyl- or the 1,1-bis(diaralkyl)hydrazines such as 2-phenylethylhydrazine or 1,1-dibenzylhydrazine. A very useful group includes hydrazines having an aryl or alkaryl radical of up to 12 carbon atoms attached to one nitrogen atom and either hydrogen or a hydrocarbon radical free of non-benzenoid unsaturation attached to the same nitrogen atom, e. g., phenylhydrazine, p-tolylhydrazine, 2,4-dimethylphenylhydrazine or 2-ethylphenylhydrazine and the 1-alkyl, aryl, aralkyl, alkaryl or cycloalkyl derivatives thereof such as 1-methyl-1-phenylhydrazine, 1-isoamyl-1-phenylhydrazine, 1-cyclohexyl-1 - o - tolylhydrazine, 1-benzyl-1-phenylhydrazine, 1,1-diphenylhydrazine, etc. In the useful hydrazines, there may be only one hydrocarbon radical attached to one of the nitrogen atoms or there may be two of the same hydrocarbon radicals or two dissimilar hydrocarbon radicals attached to the one nitrogen atom. Because of the easy availability of phenylhydrazine, the condensation products of this particular hydrazine derivative and the appropriate sultone are advantageously used in the preparation of the present fungicidal compositions.

The present sultone-hydrocarbon hydrazine adducts are readily obtained by contacting the sultone with the hydrazine at ordinary or increased temperatures and in the presence or absence of an inert diluent. Because the reaction takes place by addition of 2 moles of the hydrocarbon hydrazine to 1 mole of the sultone these reactants should be present in the reaction mixture in stoichiometric proportions; however, an excess of either reactant may be present.

The present adducts are stable products which range from viscous liquids to waxy or crystalline water-soluble solids. They are advantageously employed for a variety of industrial and agricultural purposes but are particularly useful as biological toxicants particularly as cereal plant rust eradicants. The present sultone-hydrazine addition products are particularly valuable in the control of plant rusts, whereby they function as plant chemotherapeutants against the various leaf and stem rusts of wheat, barley, rye, oats and other small grain crop plants, beans, peas, etc. They are especially useful against cereal rusts as the stem rust *Puccinia graminis tritici* or the leaf rust *P. rubigovera tritici* or the stripe rust *P. glumarum* of wheat which usually cannot be controlled by general purpose fungicides. The stem and crown rusts of oats *P. graminis avenae* and *P. coronata avenae*, as well as the stem rust of rye *P. graminis secalis*, or the leaf rust *P. hordei* of barley, display similar resistance.

In prior art, much effort has been expended in the past in breeding rust-resistant strains of these cereals; but as new strains of, e. g., wheat, are developed, new races of the above classes of rusts appear and proceed to attack the new, presumably rust-resistant strains of wheat. The history of breeding for rust resistance thus comprises a recurrent introduction of cereal strains which are resistant to prevailing races of the rusts and subsequent appearance of new races of rusts to which the recently introduced cereal strains are susceptible. Accordingly, the eradication of fungus growth by chemical treatment of cereal plants has become subjected to close scrutiny. Unfortunately, most of the known fungicides have been found to be unsuitable either because they do not prevent or destroy rust growth at non-phytotoxic concentrations or because their physical and chemical nature prevents a commercially expedient means of application. Particularly when aerial dusting or spraying is the contemplated means of application, particle size and solubility are of extreme importance.

Rust eradicant compositions may be prepared by mixing sultone-hydrazine adducts with dusting materials such as talc, clay, lime, bentonite, pumic fuller's earth, etc. The adducts may be dissolved in water or in organic solvents therefor and the resulting solutions used as fungicidal or fungi-preventing sprays.

The invention is further illustrated, but not limited, by the following examples:

Example 1

A mixture consisting of 8 g. (0.05 mole) of the sultone derived by treatment of mesityl oxide with sulfuric acid in the presence of acetic anhydride and more properly characterized as the sultone of 4-hydroxy-2-methyl-1,3-pentadiene-1-sulfonic acid, 10.8 g. (0.10 mole) of phenylhydrazine and 50 ml. of acetic acid was gradually brought to reflux and then maintained at reflux temperature, with stirring, for 4 hours. At the end of that time the solvent, i. e., the acetic acid, was removed by distillation in vacuo and there was obtained as residue 18.9 g. (100% theoretical yield) of the substantially pure 2:1 phenylhydrazine-mesityl oxide sultone. An alcoholic solution of this adduct does not precipitate a salt when made alkaline with alcoholic potassium hydroxide. No free phenylhydrazine separates on dilution of said addition product with water.

Example 2

The phenylhydrazine-mesityl oxide sultone adduct of Example 1 was tested as a wheat rust inhibiting agent employing the following procedure:

Five uniform, six-day old seedlings of a rust-susceptible variety of wheat (Seneca) were sprayed with water by means of an atomizer. The individual leaves were then gently rubbed between the thumb and index finger to remove the "bloom," and then inoculated with *Puccinia rubigo-vera tritici* by gently scraping, up and down the back sides of the rubbed leaves, a scalpel which had been water-wetted and loaded with spores of the organism. Following inoculation, the plants were sprayed with a fine mist of water and maintained for 48 hours in an incubation chamber at a temperature of 70° F. and a humidity of 100%. They were then transferred to greenhouse benches where they were kept for another 48 hours. At the end of that time they were sprayed with an emulsion prepared as follows:

The test chemical, i. e., said mesityl oxide sultone-phenylhydrazine addition product, was dissolved in water to give respective solutions containing 0.5%, 0.25% or 0.1% by weight of said product.

Spraying of the plants with the solutions was effected by means of an atomizer, 5 ml. of the solution being used per pot of 5 plants. The sprayed plants were then returned to the greenhouse and held there for a week. Observation of the plants at the end of that time disclosed that the plants which had been sprayed with the 0.5%, the 0.25% or the 0.1% solution of the mesityl oxide sultone-phenylhydrazine reaction product were entirely free of rust pustules and thriving. Similarly inoculated but unsprayed plants which had been maintained in the incubator and greenhouse for the same length of time were found to be badly affected by the rust.

What I claim is:

1. Adducts in which 2 moles of a hydrocarbon substituted hydrazine which is free of non-benzenoid unsaturation and has from 1 to 12 carbon atoms are combined with one mole of a dienic sultone of the formula

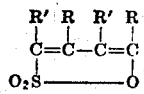

in which R is an alkyl radical of from 1 to 4 carbon atoms and R' is selected from the class consisting of R and hydrogen.

2. An adduct in which 2 moles of phenylhydrazine are combined with 1 mole of dienic sultone of the formula

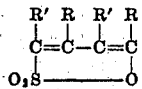

in which R is an alkyl radical of from 1 to 4 carbon atoms and R' is selected from the class consisting of R and hydrogen.

3. An adduct in which 2 moles of phenylhydrazine are combined with 1 mole of the sultone of 4-hydroxy-2-methyl-1,3-pentadiene-1-sulfonic acid.

4. The method which comprises contacting a hydrocarbon substituted hydrazine which is free of non-benzenoid unsaturation and has from 1 to 12 carbon atoms with 1 mole of a dienic sultone of the formula

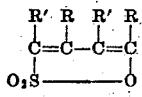

in which R is an alkyl radical of from 1 to 4 carbon atoms and R' is selected from the class consisting of R and hydrogen and recovering from the resulting reaction product an adduct in which 2 moles of said hydrazine have combined with 1 mole of said sultone.

5. The method which comprises contacting phenylhydrazine with a dienic sultone of the formula

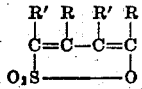

in which R is an alkyl radical of from 1 to 4 carbon atoms and R' is selected from the class consisting of R and hydrogen and recovering from the resulting reaction product an adduct in which 2 moles of said hydrazine have combined with 1 mole of said sultone.

6. The method which comprises contacting phenylhydrazine with the sultone of 4-hydroxy-2-methyl-1,3-pentadiene-1-sulfonic acid and recovering from the resulting reaction product an adduct in which 2 moles of the hydrazine have combined with 1 mole of said sultone.

7. A plant rust eradicant comprising an inert carrier and as the essential active ingredient an adduct in which two moles of a hydrocarbon substituted hydrazine which is free of non-benzenoid unsaturation and has from 1 to 12 carbon atoms are combined with one mole of a dienic sultone of the formula

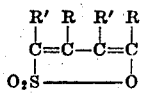

in which R is an alkyl radical of from 1 to 4 carbon atoms and R' is selected from the class consisting of R and hydrogen.

8. A wheat rust eradicant comprising an inert carrier and as the essential active ingredient an adduct in which two moles of a hydrocarbon substituted hydrazine which is free of non-benzenoid unsaturation and has from 1 to 12 carbon atoms are combined with one mole of a dienic sultone of the formula

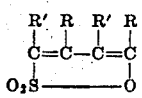

in which R is an alkyl radical of from 1 to 4 carbon atoms and R' is selected from the class consisting of R and hydrogen.

9. A wheat rust eradicant comprising an inert carrier and as the essential active ingredient an adduct in which 2 moles of phenylhydrazine are combined with 1 mole of the sultone of 4-hydroxy-2-methyl-1,3-pentadiene-1-sulfonic acid.

10. The method of inhibiting the development of rust on wheat which comprises applying to the wheat a rust eradicant composition comprising an adduct in which two moles of a hydrocarbon substituted hydrazine which is free of non-benzenoid unsaturation and has from 1 to 12 carbon atoms are combined with one mole of a dienic sultone of the formula

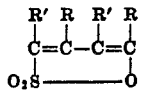

in which R is an alkyl radical of from 1 to 4 carbon atoms and R' is selected from the class consisting of R and hydrogen.

11. The method of inhibiting the development of rust on wheat which comprises applying to the wheat a rust inhibiting quantity of a rust eradicant comprising an adduct in which 2 moles of phenylhydrazine have combined with 1 mole of the sultone of 4-hydroxy-2-methyl-1,3-pentadiene-1-sulfonic acid.

References Cited in the file of this patent

UNITED STATES PATENTS 2,566,810     Smith    ------------------- Sept. 4, 1951

OTHER REFERENCES

Mustafa: Chem. Reviews 54, #2: 195–233 (1954).
Helberger: Annalen 565: 22–35 (1949).